(12) United States Patent
Herrmann

(10) Patent No.: US 6,449,079 B1
(45) Date of Patent: Sep. 10, 2002

(54) DEFLECTABLE MICRO-MIRROR

(75) Inventor: Falk Herrmann, Eningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,387

(22) PCT Filed: Nov. 24, 1999

(86) PCT No.: PCT/DE99/03725
§ 371 (c)(1),
(2), (4) Date: Nov. 20, 2000

(87) PCT Pub. No.: WO00/36452
PCT Pub. Date: Jun. 22, 2000

(30) Foreign Application Priority Data

Dec. 16, 1998 (DE) .......................... 198 57 946

(51) Int. Cl.[7] ............................... G02B 26/08
(52) U.S. Cl. ................. 359/214; 359/213; 359/196; 359/225; 359/224
(58) Field of Search ................. 359/223, 224, 359/225, 291, 292, 295, 196, 197, 198, 199, 212, 213, 214

(56) References Cited

U.S. PATENT DOCUMENTS

| | | | | |
|---|---|---|---|---|
| 5,629,794 A | * | 5/1997 | Magel et al. | 359/290 |
| 5,661,591 A | | 8/1997 | Lin et al. | 359/290 |
| 5,815,304 A | * | 9/1998 | Choi | 359/291 |
| 5,835,256 A | * | 11/1998 | Huibers | 359/291 |
| 5,861,549 A | * | 1/1999 | Neukermans et al. | 73/105 |
| 6,198,565 B1 | * | 3/2001 | Iseki et al. | 359/224 |
| 6,259,548 B1 | * | 7/2001 | Tsugai et al. | 359/224 |

FOREIGN PATENT DOCUMENTS

| | | |
|---|---|---|
| DE | 197 09 913 | 10/1998 |
| JP | 09-90249 A * | 4/1997 |

OTHER PUBLICATIONS

Hornbeck, L.J.,: "Deformable–Mirror Spatial Light Modulators" Spatial Light Modulators And Applications III, Aug. 7–8, 1989, San Diego, Aug. 7, 1989* SPIE vol. 1150, PP 86–102.

Jaecklin, V. P., et al.: "Optical Microshutters and Torsional Micromirrors For Light Modulator Arrays" Proceedings Of The Workshop On Micro Electro Mechanical Systems (MEMS), US, New York, IEEE, Bd. Workshop 6, 1993.* pp. 124–127.

Petersen, K. E.: "Silicon Torsional Scanning Mirror" IBM Journal Of Research And Development, U.S., IBM Corporation, Armonk, Bd. 24, No. 5, Sep. 1, 1980.* pp. 631–637.

(List continued on next page.)

*Primary Examiner*—Cassandra Spyrou
*Assistant Examiner*—John Juba, Jr.
(74) *Attorney, Agent, or Firm*—Kenyon & Kenyon

(57) ABSTRACT

An oscillatory micromirror having a cantilevered mirror surface is joined using at least one torsion axis formed by at least one torsion beam mounted on the mirror surface, to a support member that surrounds at least portions of the mirror surface. There is located between at least one of the torsion beams and the support member a flexural beam that performs a flexural oscillation which induces a torsional oscillation of the mirror surface about the torsion axis. At a suitable frequency, large amplitudes of the torsional oscillation may be provided by small amplitudes of the flexural oscillation.

14 Claims, 1 Drawing Sheet

OTHER PUBLICATIONS

Jaecklin, V P, et al.: "Mechanical And Optical Properties Of Surface Micromachined Torsional Mirrors In Silicon, Polysilicon And Aluminum" Sensors And Actuators A, CH, Elsevier Sequoia S.A., Lausanne, Bd. A43, No. 1/03, May 1, 1994.* pp. 269, 270, 272, and 274 Only.

Hornbeck, L. J.: "Digital Light Processing TM For High-Brightness, High-Resolution Application" Proceedings Of The Spie, 1997.* vol. 3013, pp. 27–40.

"Microelectromechanical Focusing Mirrors," IEEE (MEMS 1998), Catalog No. 98CH36176, pp. 460–465, of D.M. Burns and V.M. Bright.

Petersen, IBM J. Res. Develop. 24 (1980) 631. vol. 24, No. 5, pp. 631–637, Sep. 1980.

Jaecklin et al., Proc. IEEE MEMS Workshop, FL, USA (1993) 124–127.

* cited by examiner

DEFLECTABLE MICRO-MIRROR

FIELD OF THE INVENTION

The present invention relates to micromirror.

BACKGROUND INFORMATION

Oscillatory micromirrors in the form of an imaging concave mirror, are discussed in the publication "Microelectromechanical Focusing Mirrors," IEEE (MEMS 1998), Catalog No. 98CH36176, pages 460–465, of D. M. Burns and V. M. Bright, and have numerous technical applications in, for example, displays, scanners, and optical monitoring systems. They may be implemented using silicon technology on a silicon wafer; in the case of large mirror surfaces with areas of up to several $mm^2$, such as may be needed for use in surveying lasers or in passenger car interior monitoring systems, the entire wafer thickness may be utilized as space for deflection of the mirror. The oscillatory excitation of the micromirror may be accomplished electrostatically. One difficulty with oscillatory micromirrors of this kind having large mirror surfaces may occur when large oscillation amplitudes (several tens of degrees), such as those that may be required for the aforementioned applications, are simultaneously present. In the case of electrostatic oscillatory excitation of the micromirror, which is achieved by way of electrodes correspondingly mounted beneath the mirror, voltages of up to several hundred volts are believed to be necessary in order to attain such oscillation amplitudes (see Petersen, IBM J. Res. Develop. 24 (1980) 631; Jaecklin et al., Proc. IEEE MEMS Workshop, Fla., USA (1993) 124). The use thereof in the automotive sector, and the generation and management thereof on a micromechanical component, may be problematic. In addition, if what is desired is to operate the oscillatory micromirror in resonant fashion, this may require a complex electronic analysis system that detects very small changes in capacitance between the mirror surface and the excitation electrode located therebeneath.

SUMMARY OF THE INVENTION

It is therefore an object of an exemplary embodiment of the present invention is to provide an oscillatory micromirror that can be excited to large oscillation amplitudes with low voltages even when the mirror surface is large, thus making possible utilization even in economical applications.

The micromirror according to an exemplary embodiment of the present invention having the characterizing features of the the advantage that a small flexural oscillation amplitude is sufficient to generate a large amplitude for the torsional oscillation, induced by the flexural oscillation, of the cantilevered mirror surface about the torsion axis defined by the torsion beam. Especially if the frequency of a flexural oscillation is identical to a resonant frequency of a torsional oscillation, the amplitude of that torsional oscillation is particularly large. Because of the low amplitude of the flexural oscillation, however, the vertical movement of the mirror brought about thereby is still very small, so that, for example, any defocusing of a reflected light beam is believed to be negligible.

The mirror surface can assume almost any geometric shape, and for example can be a planar disk, a planar rectangle, or a planar square, or can have the shape of an imaging concave mirror with a circular base outline. Its size can range from a side length of a few μm up to several mm.

It is also believed to be advantageous if two oppositely located torsion beams are mounted on the oscillatory mirror surface—which, for example, has the shape of a square—in such a way that the torsion axis defined thereby does not coincide with an axis of symmetry of the mirror surface. It is also believed to be advantageous if, in the case of multiple torsion axes, at least one of the torsion axes formed by the respective number of torsion beams is not an axis of symmetry of the mirror surface.

In order to avoid excessive amplitudes of the flexural oscillation exciting the torsional oscillation, it is also believed to be advantageous if the frequency of the flexural oscillation is set such that the resonant frequency of the flexural oscillation is very different from the resonant frequency of the torsional oscillation, so that a resonant torsional oscillation does not also simultaneously result in a resonant flexural oscillation. The resonant frequency of the flexural oscillation(s) and/or the torsional oscillation(s) can be set very easily, and independently of one another, by way of the geometry of the flexural beam and the torsion beam, their mechanical properties, and their composition.

A torsional oscillation of the mirror surface about a torsion axis defined by a torsion beam can be excited via a flexural oscillation of a flexural beam if the torsion beam and the flexural beam joined thereto do not lie on one line or axis, and thus enclose an acute or obtuse angle. In particular, the torque on the mirror surface about the torsion axis brought about by the flexural oscillation is believed to be particularly great if the angle between torsion beam and flexural beam is 90°.

The oscillatory micromirror according to an exemplary embodiment of the present invention can furthermore be manufactured very advantageously and easily if the mirror surface, the torsion beams, and the flexural beams are patterned out of a silicon wafer, since in this case it is possible to utilize available silicon-based etching techniques and surface micromechanical patterning methods.

When the torsional oscillation of the oscillatory micromirror is generated according to exemplary embodiment of the present invention, it is also believed to be advantageous, especially in combination with patterning out of a silicon wafer, that an additionally necessary electrical triggering and interconnect system for the oscillatory micromirror can also be accommodated on the wafer.

The excitation via a flexural oscillation necessary in order to generate a torsional oscillation can be accomplished in very advantageous fashion by the fact that at least one thermoelectric or piezoelectric flexural transducer, which is joined to the flexural beam and induces flexural oscillations in the flexural beam, is mounted on the flexural beam at least on one side. This can advantageously be achieved by the fact that a flexural beam made of silicon is surface-doped and is thus usable as a thermoelectric flexural transducer.

In order to allow the resonant frequency of a torsional oscillation of the mirror surface to be adjusted as easily as possible, it is also believed to be advantageous if there is applied on at least one torsion beam a piezoresistive or piezoelectric transducer, in particular in the form of a thin-film transducer, so that its electrical properties or its measurement signal (piezo voltage) changes as a function of the amplitude and frequency of the torsional oscillation. The electrical signal of this transducer on the torsion beam can thus be coupled into the feedback circuit of a resonator which serves to excite the flexural oscillation via the thermomechanical or piezoelectric flexural transducer mounted on the flexural beam. The measured signal of the piezoresistive or piezoelectric transducer that detects the amplitude of the torsional oscillation thus very advantageously regulates the frequency of the flexural oscillation.

To simplify the electrical contacting of the piezoresistive or piezoelectric transducers mounted on the torsion beams and/or to create an electrical conductive connection between these transducers on the torsion beams, and to create an electrical connection between the thermoelectric or piezoelectric flexural transducers mounted on the flexural beams in order to generate the flexural oscillation, it is also believed to be very advantageous if the mirror surface and/or the torsion beams and/or the flexural beams are at least locally metallized on the surface.

In addition, it is very advantageous that the micromirror according to an exemplary embodiment of the present invention, in order to generate the torsional oscillation, requires only low voltages and, in particular, no counterelectrode, for example as in the case of electrostatic excitation. The manufacturing process can moreover be performed using available methods, and in particular a fully CMOS-compatible manufacturing process is also possible.

DETAILED DESCRIPTION

Figure 1:
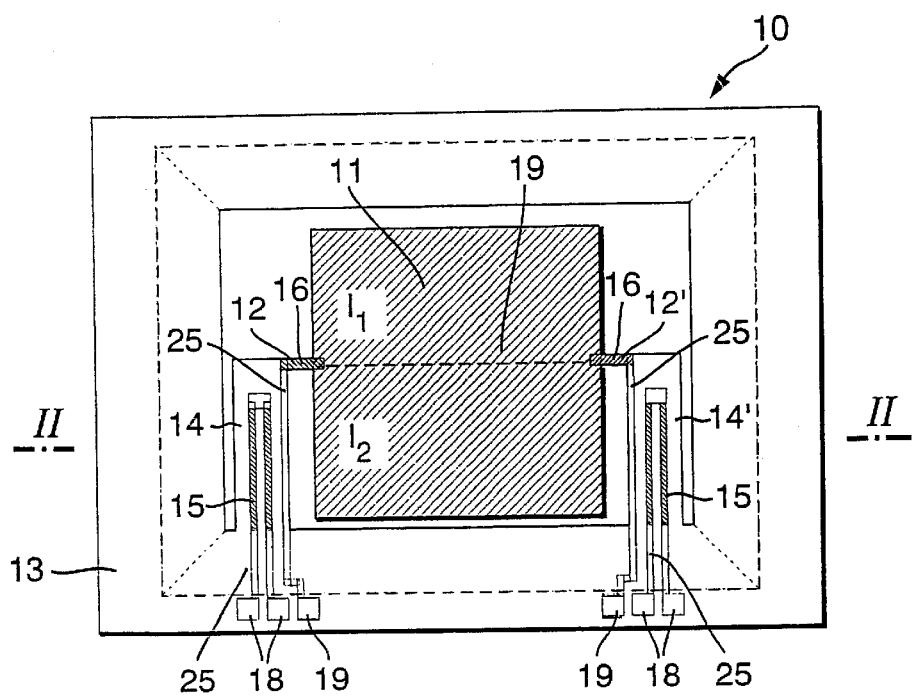
FIG. 1 shows a plan view of an oscillatory micromirror.
Figure 2:
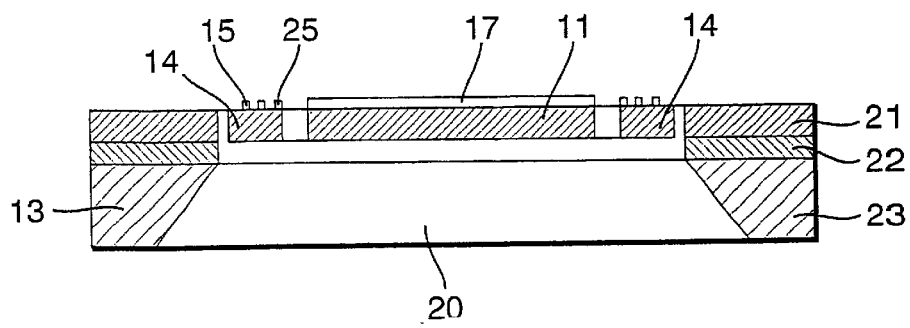
FIG. 2 shows a cross-section of the oscillatory micromirror of FIG. 1.

FIG. 1 and 2 show a first exemplary embodiment of the micromirror and an exemplary method for its manufacture. FIG. 1 shows an oscillatory micromirror 10 having a mirror surface 11 that is in the shape of a square, and two torsion beams 12, 12' joined thereto which are arranged opposite one another and define a torsion axis 19. Torsion beams 12, 12' are mounted in such a way that torsion axis 19 does not coincide with an axis of symmetry of mirror surface 11, so that longitudinal segments 11 and 12 are different from one another. Torsion beams 12, 12' are moreover each joined to a flexural beam 14, 14'. The angle between torsion beams 12, 12' and flexural beams 14, 14' is 90° in each case. Flexural beams 14, 14' are moreover joined to a support member 13 that surrounds at least portions of mirror surface 11, so that mirror surface 11 is cantilevered and can perform torsional oscillations about torsion axis 19. Mirror surface 11 has an edge length of approx. 500 μm. Mirror surface 11 can also, however, have an edge length of a few μm up to several mm. Mirror surface 11, flexural beams 14, 14', torsion beams 12, 12', and support member 13 are made substantially of silicon. Oscillatory micromirror 10 is, in particular, patterned out of a silicon wafer or an SOI (silicon on insulator) wafer.

To create a conductive connection and/or to ensure optimum reflective properties, for example in the infrared wavelength region, mirror surface 11 is metallized on the surface, preferably with gold. Torsion beams 12, 12' are coated on the surface with an available piezoresistive or piezoelectric material, constituting piezoresistive or piezoelectric thin-film transducer 16, which serves as an integrated elongation sensor so that any torsion of torsion beams 12, 12' brings about, via mechanical stresses associated therewith in thin-film transducers 16, a resistance change or the production of a piezoelectric voltage whose magnitude is proportional to the amplitude of the torsional oscillation and whose periodicity corresponds to the oscillation period of the torsional oscillation about torsion axis 19. Suitable materials for the piezoresistive or piezoelectric thin-film transducer 16 are, for example, ZnO, AlN, doped silicon, or PZT. Thin-film transducer 16 can be constructed in the form of a bridge made up of multiple individual resistors, or can utilize the entire torsion beam surface as a resistive path.

In order to connect thin-film transducers 16 on torsion beams 12, 12' to an external electrical interconnect system (not depicted), there extends on each of flexural beams 14, 14' a conductor path 25 that connects thin-film transducers 16 to electrical connecting contacts 19. Conductor path 25 is in turn created an available method, for example by a surface metallization of flexural beams 14, 14' which, in particular, is made of the same metal as surface metallization 17 of mirror surface 11 and has been patterned with the aid of suitable masking.

Located on each of flexural beams 14, 14' is a thermomechanical or piezoelectric flexural transducer 15 which is intimately joined to the flexural beams. This flexural transducer 15 is also connected, via conductor paths 25 that extend on flexural beams 14, 14' and were also created by way of a surface metallization, to electrical connecting contacts 18, so that a connection can be made to an external electrical interconnect system.

When a piezoelectric flexural transducer 15 is used, firstly mechanical stresses are induced in it via an externally applied electrical voltage; as a result of the intimate contact with flexural beams 14, 14', these stresses induce mechanical stresses on their upper side as well, thus resulting in a deflection of flexural beams 14, 14'. As the external electrical voltage changes periodically at flexural transducer 15, the result is to induce a flexural oscillation of flexural beams 14, 14' whose oscillation amplitude has a direction parallel to the surface normal line of mirror surface 11. The direction, amplitude, and period of this deflection or flexural oscillation of flexural beams 14, 14' can be controlled by way of the polarity, strength, and period of the applied electrical voltage.

If, in an alternative exemplary embodiment, a thermoelectric flexural transducer 15 is used, then the flexural oscillation is correspondingly excited via an external electrical voltage that causes surface heating of flexural beams 14, 14' and thus once again mechanical stresses in and deflection of flexural beams 14, 14'. Thermomechanical flexural converter 15 may also be coated using available methods with a thermoelectric or piezoelectric material by way of a surface coating of flexural beams 14, 14'. Suitable materials for this purpose are, for example, ZnO, AlN, PZT, or a simple metal in the form of a resistive layer. In particular, thin-film transducers 16 and flexural transducers 15 can also both be configured from the same material as piezoelectric thin-film transducers, so that thin-film transducer 16 serves to detect the torsional oscillation and flexural transducer 15 serves to excite the flexural oscillation.

A further and particularly favorable exemplary embodiment provides for torsion beams 12, 12' and/or flexural beams 14, 14' to have surface-doped silicon at least locally, so that this doped silicon layer, forming a piezoresistor, constitutes the piezoresistive thin-film transducer 16 and/or the thermomechanical flexural transducer 15.

The flexural oscillation generated via flexural beams 14, 14' induces, via torsion beams 12, 12' joined thereto and because of the vertical movement of mirror surface 11 and its inertia, a torque that results in a torsional oscillation of mirror surface 11 about torsion axis 19. This torque is particularly large if torsion axis 19 does not coincide with an axis of symmetry of mirror surface 11. The torsional oscillation occurs, however, even if torsion axis 19 is an axis of symmetry, since in this case mirror surface 11 is in a highly unstable equilibrium in terms of the flexural oscillation.

In order to achieve the greatest possible torsional oscillation amplitude, the frequency of the exciting flexural oscillation may be selected so that it coincides with a resonant frequency of the torsional oscillation. At the same time, however, the excitation frequency necessary for that purpose should not also simultaneously be a resonant frequency of the flexural oscillation, since this results in an excessive flexural oscillation amplitude. In terms of equipment, the resonant frequency of the torsional and flexural oscillations can easily be set independently of one another by way of the dimensions and composition of mirror surface 11, flexural beams 14, 14', and torsion beams 12, 12'.

In order to allow the torsional oscillation to be performed resonantly, the measurement signal supplied by the piezoresistive or piezoelectric thin-film transducer or transducers 16, which is proportional to the amplitude of the torsional oscillation, is coupled using available methods into the feedback branch of a resonator integrated into the external electrical circuit; the resonator, via the thermoelectric or piezoelectric thin-film transducers 15, induces the flexural oscillation of flexural beams 14, 14' and determines its amplitude and frequency. The frequency for exciting the flexural oscillation is thus controlled via this integrated control system in such a way that the torsional oscillation is resonant.

The exemplary embodiment explained above can moreover be modified in clearly evident fashion in such a way that, assuming torsion beam 12, and flexural beam 14 have sufficient mechanical stability, mirror surface 11 is joined only to one torsion beam 12, which by way of its orientation simultaneously defines torsion axis 19 and supports mirror surface 11 in cantilevered fashion. The configuration in this instance is otherwise analogous to the exemplary embodiment already explained. This design is, however, more susceptible to mechanical interference, and the torsional oscillation that is produced is less stable.

In addition, mirror surface 11, which furthermore can assume almost any geometrical shape, can also be equipped, for example, with four torsion beams, which for example, define two mutually perpendicular torsion axes and are respectively joined to an associated flexural beam. In this case, for example, two torsional oscillations of different or identical frequency can be superimposed on one another, so that, similarly to the trajectory of a Lissajous figure, mirror surface 11, for example, no longer reflects light only within one plane, but rather can encompass the entire space above it. The two torsional oscillations can be excited and controlled largely independently of one another; their oscillation frequency is determined, among other factors, by the geometry and arrangement of the torsion beams on mirror surface To illustrate the construction of micromirror 10, FIG. 2 shows a section through FIG. 1 along the section line shown. Mirror surface 11 is equipped on the surface with a surface metallization 17. Micromirror 10 has been patterned, using an available method, out of a silicon wafer that comprises a base layer 23 of silicon on which is located a separating layer 22 made of a silicon oxide, on which in turn a further silicon layer 21 has been applied, in the manner of an SOI (silicon on insulator) wafer. Micromirror 10 is patterned out in such a way that firstly transducers 15, 16, surface metallization 17, conductor paths 25, and contact surfaces 18, 19 are applied onto the surface. Then a pit 20 is opened in the back side of the wafer, for example by wet-chemical anisotropic etching, and mirror surface 11, torsion beams 12, 12', and flexural beams 14, 14' are patterned out on the surface of the wafer using available masking techniques and silicon etching methods. In the process mirror surface 11, flexural beams 14, 14', and torsion beams 12, 12' are then exposed, for example by back-side selective etching of the silicon oxide separating layer 22, so that they are joined in cantilevered fashion to support member 13.

An alternative manufacturing method proceeds from a silicon wafer onto which firstly a separating layer made, for example, of $Si_3N_4$, $SiO_2$, silicon oxynitride, or a conductive material, is applied. In the case where the separating layer is electrically conductive, a further insulating layer is additionally applied onto the separating layer. The remainder of the manufacturing method for micromirror 10 is then similar to the first manufacturing method.

Figure 3:
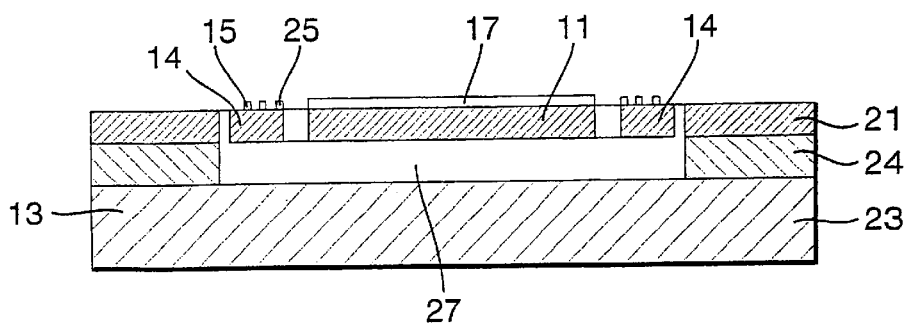
FIG. 3 shows a cross-section through another exemplary embodiment of the oscillatory micromirror.

A third variant of a manufacturing method for micromirror 10 will be explained with reference to FIG. 3. In this, there is deposited onto a base layer 23 made of silicon a sacrificial layer 24 which is made of a selectably etchable material such as $SiO_2$ or porous silicon and which is removed after the patterning of mirror surface 11, torsion beams 12, 12', and flexural beams 14, 14', and the application of surface metallization 17, conductor paths 25, contact surfaces 18, 19, and transducers 15, 16, for example using an available etching process that is selective for sacrificial layer 24, so that a cavity 27 is created beneath mirror surface 11. This manufacturing method is fully CMOS-compatible, since no wet-chemical silicon etching is required for it, so that the manufacture of micromirror 10 can readily be incorporated into an existing semiconductor line. At the same time, a definite reduction in mask count is achieved, since no electrode surfaces are required beneath mirror surface 11.

In addition, the flexural oscillation control system and the entire external electrical circuit can also be arranged on the wafer from which oscillatory micromirror 10 was also patterned.

What is claimed is:

1. An oscillatory micromirror comprising:
   a cantilevered mirror surface;
   at least one torsion beam mounted on the cantilevered mirror surface;
   a support member surrounding at least a portion of the cantilevered mirror surface;
   at least one flexural beam;
   wherein:
      the cantilevered mirror surface is joinable to the support member by at least one torsion axis formed by the at least one torsion beam;
      the at least one flexural beam is located between at least one of the at least one torsion beam and the support member, the at least one flexural beam providing a flexural oscillation for inducing a torsional oscillation of the cantilevered mirror surface about the at least one torsion axis; and
      an amplitude of the flexural oscillation is substantially smaller than an amplitude of the torsional oscillation.

2. The oscillatory micromirror of claim 1, wherein at least one of the at least one torsion axis is not an axis of symmetry of the cantilevered mirror surface.

3. The oscillatory micromirror of claim 1, wherein at least one of the at least one torsion axis is formed by the at least one torsion beam, the at least one torsion beam including two oppositely located torsion beams.

4. The oscillatory micromirror of claim 1, wherein the flexural oscillation occurs at a frequency corresponding to a resonant torsional frequency of the torsional oscillation about the at least one torsion axis.

5. The oscillatory micromirror of claim 1, wherein a frequency of the flexural oscillation is set so that a resonant frequency of the flexural oscillation is substantially different from a resonant torsonial frequency of the torsional oscillation.

6. The oscillatory micromirror of claim 1, wherein an orientation defined by a longitudinal axis of the at least one flexural beam is different from another orientation of the at least one torsion axis.

7. The oscillatory micromirror of claim 1, wherein the at least one flexural beam and at least one of the at least one torsion beam are joined to one another at an angle of 90°.

8. The oscillatory micromirror of claim 1, wherein at least one of the cantilevered mirror surface, the at least one torsion beam and the at least one flexural beam is at least locally metallized on its surface.

9. The oscillatory micromirror of claim 1, wherein at least one of the cantilevered mirror surface, the at least one torsion beam and the at least one flexural beam includes silicon.

10. The oscillatory micromirror of claim 1, further comprising: at least one of a thermoelectric flexural transducer and a piezoelectric flexural transducer for mounting on the at least one flexural beam on at least one side and for inducing the flexural oscillation in the at least one flexural beam via an external electrical circuit.

11. The oscillatory micromirror of claim 10, wherein at least one of the at least one torsion beam and the at least one flexural beam are made using silicon that is doped at a surface to form a doped silicon layer that is at least one of a piezoresistor, a piezoresistive transducer and a thermomechanical flexural transducer.

12. The oscillatory micromirror of claim 1, further comprising: at least one of a piezoresistive transducer and a piezoelectric transducer for at least mounting locally on the at least one torsion beam and for detecting an amplitude of the torsional oscillation.

13. The oscillatory micromirror of claim 12, further comprising: at least one of a thermomechanical flexural transducer and a piezoelectric flexural transducer in the at least one flexural beam, wherein the at least one of the piezoresistive transducer and the piezoelectric transducer is located in a feedback branch of a resonator, the resonator controlling the at least one of the thermomechanical flexural transducer and the piezoelectric flexural transducer so that a measurement signal of the at least one of the piezoresistive transducer and the piezoelectric transducer, which detects an amplitude of the torsional oscillation, regulates a frequency of the flexural oscillation.

14. The oscillatory micromirror of claim 1, wherein the oscillatory micromirror is made using a surface micromechanical patterning, the patterning including a silicon etching of a silicon wafer having an electrical triggering and interconnect system.

* * * * *

UNITED STATES PATENT AND TRADEMARK OFFICE
CERTIFICATE OF CORRECTION

PATENT NO.    : 6,449,079 B1
DATED         : September 10, 2002
INVENTOR(S)   : Falk Herrmann It is certified that error appears in the above-identified patent and that said Letters Patent is hereby corrected as shown below:

<u>Title page, Item [54] and Column 1, line 1,</u>
Change the title from "DEFLECTABLE MICRO-MIRROR" to -- OSCILLATORY MICROMIRROR --.

<u>Column 1,</u>
Lines 48-49, change "having the characterizing features of the" to -- is believed to have --.

Signed and Sealed this

Thirtieth Day of September, 2003

JAMES E. ROGAN
*Director of the United States Patent and Trademark Office*